(12) United States Patent
Nordhoff

(10) Patent No.: US 8,616,659 B2
(45) Date of Patent: Dec. 31, 2013

(54) VEHICLE STEERING AND BRAKING SYSTEM

(75) Inventor: Hendrik Nordhoff, Havixbeck (DE)

(73) Assignee: Deere & Company, Moline, IL (US)

( * ) Notice: Subject to any disclaimer, the term of this patent is extended or adjusted under 35 U.S.C. 154(b) by 639 days.

(21) Appl. No.: 12/498,409

(22) Filed: Jul. 7, 2009

(65) Prior Publication Data
US 2010/0007204 A1  Jan. 14, 2010

(30) Foreign Application Priority Data
Jul. 10, 2008  (DE) .......................... 10 2008 040 326

(51) Int. Cl.
*B60T 8/36* (2006.01)
(52) U.S. Cl.
USPC ........................................ 303/119.1; 188/350
(58) Field of Classification Search
USPC ............... 180/350; 303/123, 190, 191, 116.1, 303/119.1, 119.2, 119.3
See application file for complete search history.

(56) References Cited

U.S. PATENT DOCUMENTS

| 3,917,013 | A | * | 11/1975 | Orr ................................ 180/6.7 |
| 5,293,956 | A | | 3/1994 | Onishi |
| 6,059,383 | A | | 5/2000 | Paggi et al. |
| 6,322,163 | B1 | * | 11/2001 | Siegel ........................ 303/115.4 |
| 6,961,649 | B2 | * | 11/2005 | Kato et al. ....................... 701/70 |

FOREIGN PATENT DOCUMENTS

| DE | 27 50 851 | | 5/1979 |
| DE | 36 37 481 | | 9/1987 |
| DE | 37 19 821 | | 12/1988 |
| DE | 42 24 887 | | 9/1993 |
| DE | 101 45 789 | | 4/2003 |
| EP | 0 275 985 | | 1/1988 |
| GB | 2188012 | A * | 9/1987 |

* cited by examiner

*Primary Examiner* — Xuan Lan Nguyen

(57) ABSTRACT

The invention concerns a steering and braking system for a motor vehicle which has wheels on opposite sides thereof. Each wheel has a brake unit that can be controlled by an operator actuating a brake device, such as a brake pedal. At least one of the brake units is controlled in response to a turning maneuver of the motor vehicle independent of the actuation of the brake pedal, so that a higher braking force is applied to an inside one of the brake units with respect to the curve than is applied to an outside one of the brake units with respect to the curve.

7 Claims, 1 Drawing Sheet

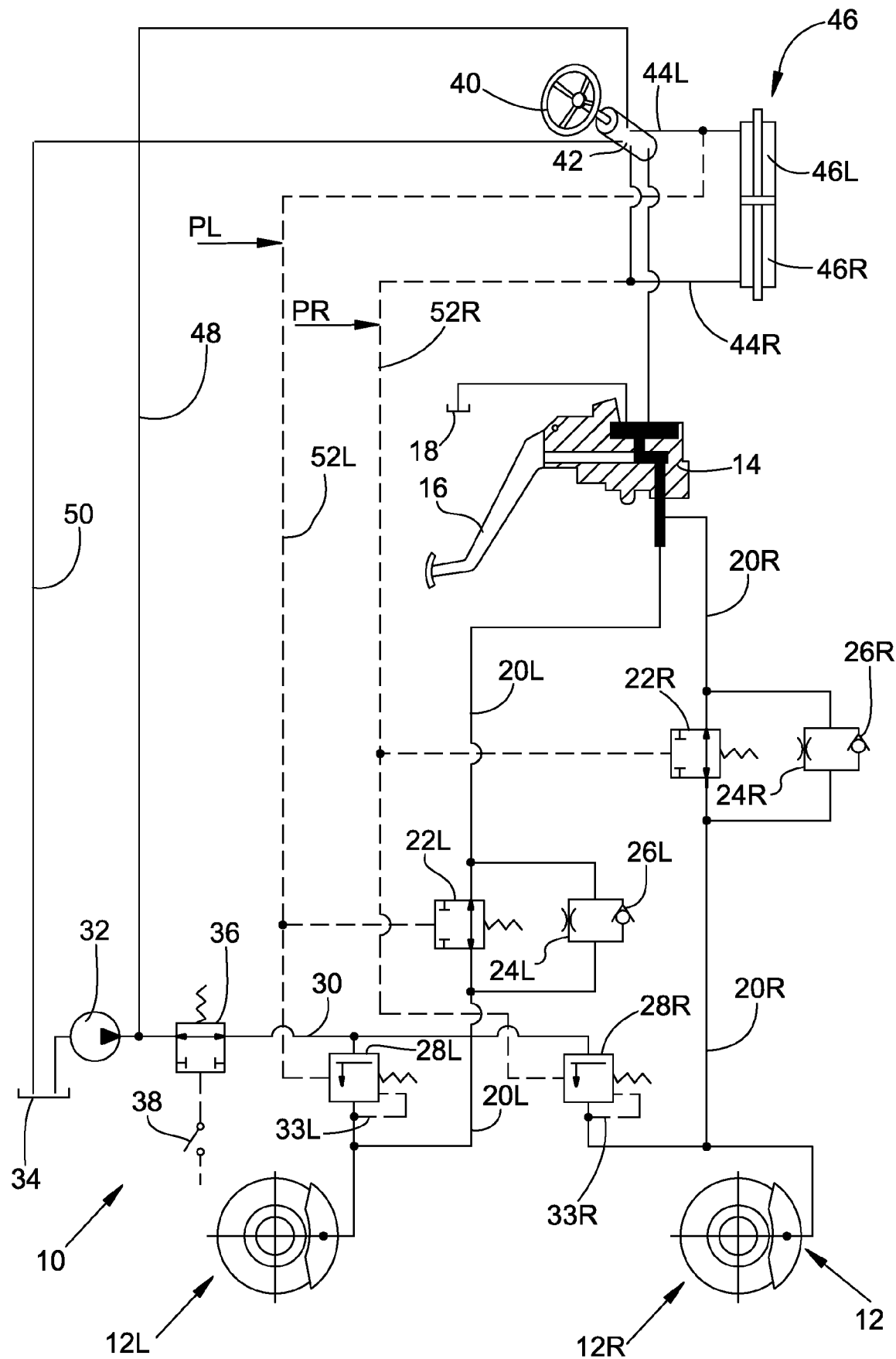

VEHICLE STEERING AND BRAKING SYSTEM

FIELD OF THE INVENTION

The present invention relates to a steering and braking system for a motor vehicle, with vehicles wheels arranged on opposite sides of the motor vehicle, where each of the vehicle wheels is associated with a wheel brake unit that can be controlled by the operator by means of a brake operating element.

BACKGROUND OF THE INVENTION

The application of steering and braking systems is widely applied to utility vehicles, particularly agricultural vehicles, such as, for example, tractors or the like. The steering and braking system permits the control of the direction of operation of the motor vehicle beyond the effect of a conventional stub axle steering control.

The principle of the steering and braking system relies upon a change or a repositioning of the distribution of the braking or driving forces between the two sides of the motor vehicle. The distribution of the braking or driving forces is performed in such a way that a yaw moment supporting the immediate direction of operation is built up in the direction of the vertical axis of the motor vehicle. In the simplest case at least one of the vehicle wheels is braked on one side of the motor vehicle, while the remaining vehicle wheels remain not braked. In this way a reduction of the turning circle diameter, in particular, can be attained during the performance of a turning maneuver.

Such a steering and braking system for a motor vehicle is known from DE 27 50 851 A1. The steering and braking system is a component of a hydraulic operating brake system of a motor vehicle. The hydraulic operating brake system includes several hydraulic wheel brake cylinders for braking associated vehicle wheels, where the wheel brake cylinders can be controlled by the operator by means of brake pedal. To perform a steering and braking process the wheel brake cylinders of at least each of the rear wheels of the motor vehicle can be controlled separately by actuation of the associated hand brake levers. Since the operator must manually actuate both hand brake levers of the steering and braking system, the performance of the steering and braking process is comparably uncomfortable.

A comparable steering and braking system is disclosed by DE 101 45 789 A1. In place of manual brake levers, separate brake pedals are provided for the performance of the steering and braking process, where for operation on public roads, the brake pedals can be connected mechanically with each other.

Furthermore, EP 275 985 A2 discloses a steering and braking system for a tractor. The supply of the brakes with hydraulic fluid is performed by a pedal-operated master-cylinder that can be connected selectively over intervening electrical positioning systems with a brake cylinder of a right and/or a left driven vehicle wheel. An electrical switch contact system is used to recognize a steering angle existing at the steerable vehicle wheels. The electrical switch contact system interacts with the electrical positioning system in such a way that the connection between either the right or the left connection between the master cylinder and the brake cylinder is blocked. The performance of the steering and braking process is therefore exclusively possible in such operating conditions, in which a braking of the tractor is performed simultaneously by actuation of the brake cylinder by the operator. Therefore, the flexibility of the steering and braking systems is comparatively limited.

SUMMARY OF THE INVENTION

Accordingly, an object of this invention is to provide a vehicle steering and braking system which makes possible a comfortable and improved performance in terms of the flexibility of the steering and braking system in connection with a turning maneuver of the motor vehicle.

This and other objects are achieved by the present invention, wherein the steering and braking system for a motor vehicle includes vehicle wheels arranged on opposite sides of the vehicle, where each of the vehicle wheels is associates with a wheel brake unit that can be controlled by the operator by means of a brake operating element. According to the invention, at least one of the wheel brake units is controlled in such a way that upon recognition of a turning maneuver of the motor vehicle it is controlled in such a way that independently of the operation of the brake element for the performance of a steering and braking process, relative to a common vehicle axle that a wheel on the inside of a curve is loaded with a higher braking force than a vehicle wheel on the outside of the curve. Thereby the vehicle tilts or yaws in a direction which reduces the turning circle and improves the turning performance of the motor vehicle.

The steering and braking process is thereby performed, as is the preceding performance of the turning maneuver, automatically and—in the sense of the greatest possible flexibility of the steering and braking system—without limitation to a certain operating situation.

Preferably the vehicle axle is a driven rear axle of the motor vehicle. Alternatively or in addition it may also be a steered front axle. The motor vehicle may in particular, be configured as an all wheel drive, so that the front axle as well as the rear axle is connected to a drive system of the motor vehicle. The drive system includes in particular, an internal combustion engine, as well as a clutch and a gear box unit interacting with the internal combustion engine. A differential gearbox arranged between the driven wheels of each particular vehicle axle permits a purposeful distribution of the drive torque in favor of the vehicle wheels on the inside of the curve and thereby an additional support of the steering and braking process.

The wheel brake units may, for example, be components of a hydraulic operating brake system of the motor vehicle, where the wheel brake units can be actuated on the part of the operator by actuation of a brake actuating element that is connected to a hydraulic brake valve or brake force amplifier. The wheel brake systems include a brake lever connecting rod or a cheek arranged fixed to the motor vehicle with a brake cylinder that can be controlled hydraulically as well as a brake disk or a brake drum connected, fixed against rotation, to the particular vehicle wheel.

The brake operating element may be a common brake pedal arranged near the operator's foot provided for controlling the wheel brake units of both sides of the vehicle relative to the vehicle wheels. Alternatively there is also the possibility of providing separate brake pedals for controlling the wheel brake units of each side of the vehicle. These may be connected to each other for braking the motor vehicle by means of a locking mechanism associated with the brake valve.

Preferably the at least one wheel brake unit can be connected to a hydraulic brake line with the hydraulic brake valve, so that it can be controlled independently of the remaining wheel brake units by loading with brake pressure.

The latter is made possible by at least one wheel brake unit that is connected over a hydraulic pressure control valve to a hydraulic supply of the motor vehicle. Here the pressure control valve can be transferred against an opposing spring force from an open to a closed position. The hydraulic supply of the motor vehicle, includes, for example, a hydraulic pressure pump, in particular an axial piston pump supplied by a hydraulic reservoir.

In order to prevent, in this case, an undesired drop off in the wheel brake pressure of the at least one wheel brake unit on the basis of the flow of hydraulic fluid in the direction of the brake valve, there is the possibility of providing a hydraulic blocking valve in the hydraulic brake line that is hydraulically controlled. Here the blocking valve can be transferred from a closed to an open position against a reversing spring force.

In addition, a system parallel to the hydraulically controlled blocking valve may be provided, consisting of a throttle valve and/or a one way valve permitting flow in the direction of the at least one wheel brake unit. The throttle valve permits a controlled flow of hydraulic fluid in the direction of the brake valve, so that the buildup of the overpressure of the at least one wheel brake unit can be opposed when the blocking valve is open. The one way valve configured in particular as a spring controlled check valve provides the assurance that the at least one wheel brake unit can be controlled by actuation of the brake actuating element or the brake valve interacting with it can be controlled together with the usual wheel brake units, and that the motor vehicle can be brought to a halt at any time during the performance of the steering and braking process.

In order to recognize a turning maneuver initiated by the operator there is the possibility of evaluating the actuation characteristics of a steering actuating system, that is provided for the operation on the part of the operator of steerable vehicle wheels. The recognition of the turning maneuver can be performed either by evaluation of the magnitudes immediately connected with the operating characteristics, for example a steering deviation brought about by the operating element or an actuating force, or by the evaluation of magnitudes of the actuating characteristics of the steering operating element, for example a steering angle produced on the steerable vehicle wheel or a control pressure at the steering valve or the steering force amplifier for the control of a hydraulic steering cylinder.

The steering operating element, for example, is a conventional steering wheel. It would also be conceivable to provide a combination steering and braking element in the form of a joy stick or the like.

The steerable vehicle wheels may be associated with a front axle or a rear axle of a motor vehicle, where the steering is configured, for example, as a conventional steering knuckle control. It is also conceivable that a hydraulic controllable articulated joint is provided between a front and a rear vehicle part.

That a turning maneuver exists can also be concluded under other items when an actuation occurs by the steering operating element that points to a maximum deflection of the steerable wheels. In the case of a steering operating element configured as a steering wheel, this typically occurs when the steering wheel displays a steering deflection corresponding to both its end stops.

Preferably a hydraulic steering valve is provided for the operation for the steerable vehicle wheels, such as a orbital steering valve connected to the hydraulic steering cylinder over associated hydraulic lines interacting with the steerable vehicle wheels. In particular, all told two hydraulic control lines are provided for the opposite control of the steering cylinder, where, depending on the direction of steering, in which an increasing control pressure is built up in either one or the other hydraulic line in the direction of the maximum steering angle of the steerable vehicle wheels. Thereby the pressure relationships existing in the hydraulic control line are in a clear connection with the direction and the amount of the steering deflection existing at the steerable vehicle wheels.

Therefore the control pressure existing at the steering valve provides a reliable index of the existence of a turning maneuver, so that it can also be used directly for the performance of the steering and braking process. For this purpose, the blocking valve and/or the pressure control valve are provided with a control inlet connected with one of the two hydraulic control lines where an actuation of the blocking valve and/or the pressure control valve occurs when the control pressure at the control valves exceeds a predetermined threshold value. The threshold pressure is preferably provided as input that corresponds generally to the control pressure existing in the case of a maximum steering deflection of the steerable vehicle wheels.

If the control pressure exceeds the predetermined threshold value, then the blocking valve assumes its open position and the pressure control valve assumes its closed position. Thereby on the one hand the connection between the at least one and the brake valve is broken, but on the other hand the at least one wheel brake unit Is connected to the hydraulic supply of the motor vehicle in such a way that the pressure at the inlet side of the pressure control valve is made available by the hydraulic system of the motor vehicle and is controlled to a generally constant brake pressure for the performance of the steering and braking process.

In order to avoid a steering and braking process undesired by the operator, there is the possibility of arranging a blocking valve between the hydraulic supply of the motor vehicle and the pressure control valve. Here the actuation of the blocking valve is performed by means of an operating element arranged in the motor vehicle.

The motor vehicle may be a two track agricultural utility vehicle, for example a tractor or the like. However an application of the steering and braking system according to the invention is also possible in connection with any other desired vehicle, for example, construction machines or the like.

The motor vehicle may be a two track agricultural utility vehicle, for example, a tractor or the like. The motor vehicle is provided with a steered front axle as well as a driven rear axle. Each of the vehicle axles includes vehicle wheels arranged on opposite sides of the motor vehicle that may be braked by means of associated wheel brake units. The wheel brake systems are of conventional configuration and are provided with a brake rod rigidly connected to the motor vehicle and with a hydraulically controlled brake cylinder as well as a brake disk rigidly connected to each particular wheel.

BRIEF DESCRIPTION OF THE DRAWINGS

The sole FIGURE is a schematic diagram of a vehicle steering and braking system, according to the invention.

DESCRIPTION OF THE PREFERRED EMBODIMENT

The steering and braking system 10 for a motor vehicle (not shown) includes two wheel brake units 12R and 12L for an axle (not shown), such as a driven rear axle (not shown). The wheel brake units 12R and 12L are components of a hydraulic system of the motor vehicle. The wheel brake units 12R and 12L, as are also the other wheel brake units (not shown), can be controlled by the operator by a brake operating element, such as pedal 16 connected to a hydraulic brake valve 14. The brake valve 14 simultaneously functions as a brake pressure amplifier which is supplied by a brake fluid reservoir 18. Left and right brake pedals may be provided together arranged in the foot space of the operator.

Each of the wheel brake units 12R and 12L is connected to the hydraulic brake valve 14 over a corresponding brake line 20R and 20L. The hydraulically controlled blocking valves 22R and 22L are arranged in the hydraulic brake lines 20R and 20L for the interruption of the connection between the wheel brake unit 12R and 12L and the brake valve 14, the blocking valves 22R and 22L can be moved from a closed to an open position against an opposing spring force.

In addition, a system is provided, consisting of a throttle valve 24R and 24L or a one way valve 26R and 26L that permits flow in the direction of the wheel brake unit 12R and 12L, this system is switched in parallel to a hydraulically controlled blocking valve 22R and 22L. The throttle valve 24R and 24L permits a controlled outflow of hydraulic fluid in the direction of the brake valve 14, so that the buildup of an overpressure in the wheel brake unit 12R and 12L can be counteracted when the blocking valve 22R and 22L is closed. The one way valves 26R and 26L are configured as spring actuated check valves to assure that the wheel brake units 12R and 12L can be closed by actuation of the brake pedal 16 or the brake valve 14, that may interact with it, together with the remaining wheel brake units of the motor vehicle.

For the control, independent of the operator, of the wheel brake units 12R and 12L these are connected by hydraulically controllable pressure control valves 28R and 28L, and hydraulic lines 30 with a pump 32. The pressure control valves 28R and 28L can be moved from an open position to a closed position against an opposing spring force.

The pump 32 may be an axial piston pump supplied from a hydraulic fluid reservoir 34 that produces an output pressure in the pressure range of 30 bar.

An electrically controlled blocking valve 36 arranged between the pump 32 and the pressure control valve 28R and 28L permits an interruption of a connection established over the hydraulic line 30. The actuation of the blocking valve 36 is performed by an operating element 38, for example a rocker switch or the like.

In addition, an wheel 40 is provided at the side of the operator for the actuation on the part of the operator of steerable vehicle wheels. The steering wheel 40 may be a conventional steering wheel. Here the steerable vehicle wheels are associated with the front axle of the motor vehicle.

The steering wheel 40 controls hydraulic steering valve 42. In the present case, the steering valve 42 is an orbital steering valve that is connected with a hydraulic steering cylinder 46 over associated hydraulic control lines 44R and 44L interacting with steerable vehicle wheels. For the opposing control of the steering cylinder 46 here a total of two hydraulic control lines 44R and 44L are provided, that are connected with corresponding piston chambers 46R and 46L of the steering cylinder 46, where, depending on the direction of steering angle of the steerable vehicle wheels an increasing control pressure pi is built up depending on the direction of steering either in the one or the other hydraulic control lines 44R and 44L.

More specifically, the steering valve 42 is connected to the pump 32 and to reservoir 34 via a supply line 48.

If the steering wheel 40 is in its neutral position—corresponding to a straight ahead direction of the motor vehicle—the hydraulic fluid flows through the steering valve 42 and over a return line 50 back into hydraulic fluid reservoir 34.

If the steering wheel 40 is deflected to the right or to the left, then a proportional amount of hydraulic fluid flows through the steering valve 42 and over the corresponding hydraulic control line 44R or 44L into the associated piston chamber 46R or 46L of the steering cylinder 46. Thereby the hydraulic fluid displaced from the opposing piston chamber 46L or 46R is drained off in the direction of the hydraulic fluid reservoir 34 over the corresponding hydraulic control line 44L or 44R as well as the steering valve 42.

To sense a turning maneuver initiated by the operator as well as for the actuation of an automatic steering and braking process, the blocking valve 22R and 22L and/or the pressure control valve 28R and 28L is provided with a control inlet connected with the hydraulic control line 44R and 44L over an associated pilot line 52R and 52L, where an actuation of the blocking valve 22R and 22L and/or the pressure control valve 28R and 28L occurs when the control pressure at the steering valve 42 exceeds a predetermined threshold value Pref. The threshold value Pref is chosen so that it corresponds to the control pressure P that occurs in the case of the maximum steering angle of the steerable vehicle wheels. The latter typically occurs in an order of magnitude of 180 bar. Correspondingly the threshold value Pref is provided as input with a magnitude of 160 bar.

If the control pressure P exceeds the predetermined control pressure Pref then the blocking valve 22R and 22L assumes its open position and the pressure control valve 28R and 28L assumes its closed valve position. Thereby on the one hand the connection between the wheel brake unit 12R and 12L and the brake valve 14 is interrupted, but on the other hand, the wheel brake unit 12R and 12L is connected with the pump 32 of the motor vehicle in such a way that the pressure at the inlet of the pressure control valve 28R and 28L as made available by the pump 32 of the motor vehicle is connected in such a way that the pressure is controlled to the magnitude of 20 bar brake pressure for the execution of the steering and braking process. Here the control of the brake pressure is performed by means of a sensor line 33R and 33L arranged at the outlet side of the pressure control valve 28R and 28L.

If the brake operating element 16 is in the non operating condition, then accordingly, the vehicle wheel system 12R and 12L associated with the vehicle wheel is braked, while the remaining vehicle wheels remain unbraked. Thereby the vehicle yaws in a direction which reduces the turning circle, and thereby improves the turning performance of the vehicle.

If the control pressure P is less than the predetermined threshold value Pref, then the end of the turning maneuver can also be concluded. In this case the blocking valve 22R and 22L as well as, for example, the pressure control valve 28R and 28L return to the valve position indicated by the returning spring force.

In other words, the wheel brake units 12R and 12L are controlled so that, when the vehicle is turning, independently of the operation of the brake operating element 16, the inner vehicle wheel on the inside of the curve is loaded with a greater braking force than the outer vehicle wheel on the outside of the curve.

In the case of a right turn, the right the wheel brake unit 12a, associated with the right side of the motor vehicle, is thereby controlled. Inversely, in the case of a left turn, the wheel brake unit 12b associated with the left side of the motor vehicle is controlled. But it should also be noted that basically a combined control of both wheel brake units 12a and 12b is conceivable, in which an asymmetrical loading with brake pressure is applied depending on the direction of the turning maneuver.

While the present invention has been described in conjunction with a specific embodiment, it is understood that many alternatives, modifications and variations will be apparent to those skilled in the art in light of the foregoing description. Accordingly, this invention is intended to embrace all such alternatives, modifications and variations which fall within the spirit and scope of the appended claims.

I claim:

1. A steering and braking system for a motor vehicle having left and right vehicle wheels, left and right hydraulic brake units for braking the corresponding wheels, the steering and braking system comprising:
    an operator controlled steering input member;
    a steering cylinder;
    a hydraulic pump;
    a hydraulic steering control valve connected to the pump and to the steering cylinder, the hydraulic steering control valve being controlled by the steering input member, and the hydraulic steering control valve controlling flow of hydraulic fluid to the steering cylinder;
    an operator controlled brake operating element;
    a hydraulic brake valve controlled by the operating element, the hydraulic brake valve being connected directly to each of the brake units by a corresponding hydraulic brake line and a corresponding brake blocking valve; and
    a pair of pressure control valves, each pressure control valve having an inlet connected directly to the pump through a pump blocking valve, each pressure control valve having an outlet connected directly to the corresponding hydraulic brake line, and each pressure control valve having a control input connected to the hydraulic steering control valve, and in response to a turning of the vehicle in a curve, the hydraulic steering control valve causing one of the pressure control valves connected to an inside one of the brake units with respect to the curve to connect the pump to said inside brake unit to apply a higher braking force to said inside brake unit than to an outside one of the brake units with respect to the curve, the brake units being operated by the pressure control valves when the vehicle is turning independently of operation of the brake operating element.

2. The steering and braking system of claim 1, wherein:
one of the brake blocking valves is arranged in each of the hydraulic brake lines.

3. The steering and braking system of claim 2, wherein:
each of the brake blocking valves is connected in parallel with a throttle and a one way valve which permits flow towards the corresponding wheel brake unit.

4. The steering and braking system of claim 1, wherein:
the steering and braking system is responsive to operator movement of a steering operating element.

5. The steering and braking system of claim 1, wherein:
the hydraulic steering control valve generates a hydraulic steering pressure, and the steering and braking system responds to a turning of the vehicle when the steering pressure exceeds a predetermined threshold value (Pref).

6. The steering and braking system of claim 5, wherein:
each pressure control valve is actuated when the control pressure exceeds a predetermined threshold value (Pref).

7. The steering and braking system of claim 1, wherein:
the pump blocking valve is connected between the pump and both brake units, the pump blocking valve being actuated by the vehicle operator.

* * * * *